(12) United States Patent
Tai et al.

(10) Patent No.: US 8,987,597 B2
(45) Date of Patent: Mar. 24, 2015

(54) FLAME RETARDANT THERMOPLASTIC ELASTOMER

(75) Inventors: Xiang Y. Tai, Tochigi (JP); Wei G. Yao, Shanghai (CN); Yu D. Qi, Shanghai (CN); Given J. Chen, Shanghai (CN); Robert F. Eaton, Belle Mead, NJ (US)

(73) Assignee: Dow Global Technologies LLC, Midland, MI (US)

( * ) Notice: Subject to any disclaimer, the term of this patent is extended or adjusted under 35 U.S.C. 154(b) by 386 days.

(21) Appl. No.: 13/387,865

(22) PCT Filed: Jul. 31, 2009

(86) PCT No.: PCT/CN2009/073020
§ 371 (c)(1),
(2), (4) Date: Jan. 30, 2012

(87) PCT Pub. No.: WO2011/011921
PCT Pub. Date: Feb. 3, 2011

(65) Prior Publication Data
US 2012/0132457 A1     May 31, 2012

(51) Int. Cl.
| | |
|---|---|
| *H01B 7/00* | (2006.01) |
| *C08L 75/08* | (2006.01) |
| *C08G 18/42* | (2006.01) |
| *C08G 18/48* | (2006.01) |
| *C08K 5/00* | (2006.01) |
| *C08L 75/06* | (2006.01) |

(Continued)

(52) U.S. Cl.
CPC ............. *C08L 75/08* (2013.01); *C08G 18/4238* (2013.01); *C08G 18/4854* (2013.01); *C08K 5/0066* (2013.01); *C08L 75/06* (2013.01); *C08G 77/04* (2013.01); *C08K 3/0058* (2013.01); *C08K 3/22* (2013.01); *C08K 5/523* (2013.01); *C08L 23/0853* (2013.01); *C08L 31/04* (2013.01)
USPC .................................. 174/110 R; 174/110 SR (58) Field of Classification Search
USPC .... 174/110 R, 110 A–110 FC, 113 R, 120 R, 174/121 R, 121 A, 121 AR, 121 SR, 122 R, 174/120 C, 120 AR
See application file for complete search history.

(56) References Cited

U.S. PATENT DOCUMENTS

| | | | |
|---|---|---|---|
| 4,286,080 A * | 8/1981 | Quiring et al. | ................. 525/455 |
| 4,385,133 A | 5/1983 | Alberino et al. | |

(Continued)

FOREIGN PATENT DOCUMENTS

| | | |
|---|---|---|
| EP | 1491580 A1 | 12/2004 |
| JP | H07-331084 A | 12/1995 |

(Continued)

OTHER PUBLICATIONS

Machine translation of JP2003-064257.
(Continued)

*Primary Examiner* — William H Mayo, III
(74) *Attorney, Agent, or Firm* — Whyte Hirschboeck Dudek S.C.

(57) ABSTRACT

The present disclosure provides a composition which includes a thermoplastic elastomer and a flame retardant composed of a metal hydrate and an oligomeric phosphate ester. The weight ratio of metal hydrate to oligomeric phosphate ester is greater than 1.45:1. The composition may be a component of an article such as a coated wire or a coated cable, with the composition present in the coating.

9 Claims, 2 Drawing Sheets

(51) Int. Cl.

| | | |
|---|---|---|
| C08G 77/04 | (2006.01) | |
| C08K 3/00 | (2006.01) | |
| C08K 3/22 | (2006.01) | |
| C08K 5/523 | (2006.01) | |
| C08L 23/08 | (2006.01) | |
| C08L 31/04 | (2006.01) | |

(56) References Cited

U.S. PATENT DOCUMENTS

| | | | |
|---|---|---|---|
| 4,397,974 A | | 8/1983 | Goyert et al. |
| 4,522,975 A | | 6/1985 | O'Connor et al. |
| 4,857,600 A | | 8/1989 | Gross et al. |
| 5,162,387 A | * | 11/1992 | Abel et al. ............... 521/156 |
| 5,167,899 A | | 12/1992 | Jezic |
| 5,575,965 A | | 11/1996 | Caronia et al. |
| 5,726,227 A | * | 3/1998 | Magerstedt et al. ........ 524/107 |
| 7,358,311 B2 | * | 4/2008 | Roth et al. ................ 525/375 |
| 2002/0006263 A1 | | 1/2002 | Mehl et al. |
| 2004/0265509 A1 | * | 12/2004 | Roth et al. ................ 428/1.1 |
| 2007/0261878 A1 | | 11/2007 | Kosaka et al. |
| 2008/0167419 A1 | * | 7/2008 | Eipper et al. .............. 524/539 |
| 2011/0130491 A1 | * | 6/2011 | Fukushima et al. ........ 524/100 |

FOREIGN PATENT DOCUMENTS

| | | |
|---|---|---|
| JP | H11-269379 A | 10/1999 |
| JP | 2003-64257 | 3/2003 |

OTHER PUBLICATIONS

Machine translation of JP7-331084.
Machine translation of JP11-269379.

* cited by examiner

FLAME RETARDANT THERMOPLASTIC ELASTOMER

BACKGROUND

The present disclosure is directed to flame retardant thermoplastic elastomers.

Halogen-containing materials such as polyvinyl chloride (PVC) find widespread use in wire and cable applications. Ecological and health concerns are driving efforts to find viable alternatives to PVC. Thermoplastic elastomers are seen as a potential halogen-free replacement to PVC as thermoplastic elastomers and PVC are similar in many physical and mechanical aspects. Wire and cable applications, however, require flame retardancy. Adding flame retardants to thermoplastic elastomers oftentimes degrades the desired physical and mechanical properties of the thermoplastic elastomer.

Desirable would be a halogen-free flame retardant thermoplastic elastomer with suitable mechanical and physical properties for wire and cable applications and flexible wire/cable in particular.

SUMMARY

The present disclosure provides a composition. In an embodiment, a composition is provided and includes from about 12 wt % to about 50 wt % of a thermoplastic elastomer and from about 48 wt % to about 75 wt % of a flame retardant. The thermoplastic elastomer has a Shore hardness less than 50 D. The flame retardant includes a metal hydrate and an oligomeric phosphate ester. The weight ratio of metal hydrate to oligomeric phosphate ester is greater than 1.45:1.

The present disclosure provides another composition. In an embodiment, a composition is provided and includes a thermoplastic elastomer, a polar olefin-based polymer, and a flame retardant. The flame retardant includes a metal hydrate and an oligomeric phosphate ester.

The present disclosure provides an article. In an embodiment, an article is provided and includes at least one component composed of a composition comprising a thermoplastic elastomer and a flame retardant. The thermoplastic elastomer has a Shore hardness less than 50. The flame retardant includes a metal hydrate and an oligomeric phosphate ester. The weight ratio of metal hydrate to organic phosphate is greater than about 1.45:1.

In an embodiment, the article comprises a metal conductor and a coating on the metal conductor. The coating includes the composition.

DETAILED DESCRIPTION

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of thermoplastic elastomer, flame retardants, UV-stabilizer, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and copolymers.

In an embodiment, a composition is provided. The composition includes a thermoplastic elastomer and a flame retardant. The flame retardant is composed of a metal hydrate and an oligomeric phosphate ester. The weight ratio of metal hydrate to organic phosphate is greater than about 1.45:1. The weight ratio is based on the total weight of the composition.

In an embodiment, the thermoplastic elastomer has a Shore hardness less than 50 D.

A "thermoplastic elastomer," as used herein, is a polymer (1) that has the ability to be stretched beyond its original length and retract to substantially its original length when released and (2) softens when exposed to heat and returns to substantially its original condition when cooled to room temperature. The present thermoplastic elastomers are not crosslinked, or are otherwise void of crosslinking. The present thermoplastic elastomers are distinct from, and do not include, "thermosetting polymers" which solidify or "set" irreversibly when heated. Nonlimiting examples of suitable thermoplastic elastomers include thermoplastic polyurethane ("TPU"), thermoplastic polyester elastomer (TPEE), polyamide elastomer, and any combination thereof.

In an embodiment, the thermoplastic elastomer excludes non-polar olefin-based polymers such as non-polar ethylene-based polymers and non-polar propylene-based polymers.

A "thermoplastic polyurethane" (or "TPU"), as used herein, is the reaction product of a polyisocyanate, one or more polymeric diol(s), and optionally one or more difunctional chain extender(s). The TPU may be prepared by the prepolymer, quasi-prepolymer, or one-shot methods.

The polyisocyanate may be a di-isocyanate. The di-isocyanate forms a hard segment in the TPU and may be an aromatic, an aliphatic, and a cycloaliphatic di-isocyanate and combinations of two or more of these compounds. A nonlimiting example of a structural unit derived from di-isocyanate (OCN—R—NCO) is represented by formula (I) below:

(I)

in which R is an alkylene, cycloalkylene, or arylene group. Representative examples of these di-isocyanates can be found in U.S. Pat. Nos. 4,385,133; 4,522,975 and 5,167,899. Nonlimiting examples of suitable di-isocyanates include 4,4'-di-isocyanatodiphenylmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol has a molecular weight (number average) in the range from 200 to 10,000 g/mole. More than one polymeric diol can be employed. Nonlimiting examples of suitable polymeric diols include polyether diols (yielding a "polyether TPU"); polyester diols (yield a "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions used in the practice of this disclosure may contain from 2 to 25, or from 3 to 20, or from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, or from about 1:2 to about 1:10. At the same time the overall ratio of isocyanate equivalents to equivalents of active hydrogen containing materials is within the range of 0.90:1 to 1.10:1, or, 0.95:1 to 1.051

Additives may be used to modify the properties of the polyurethane used in the practice of this disclosure. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica and the like. Also, fibrous additives, such as glass or carbon fiber, may be added to impart certain properties.

In one embodiment, the TPU has a density greater than, or equal to, 0.90 g/cc, or greater than or equal to 0.95 g/cc, or greater than or equal to 1.00 g/cc. In another embodiment, the TPU has a density less than or equal to 1.30 g/cc, or less than or equal to 1.25 g/cc, and or less than or equal to 1.20 g/cc. In another embodiment, the TPU has a density from 0.90 g/cc to 1.30 g/cc, or from 0.95 g/cc to 1.25 g/cc, or from 1.00 g/cc to 1.20 g/cc.

In one embodiment, the TPU has a melt index greater than or equal to 0.1 g/10 min, or greater than or equal to 0.5 g/10 min, or greater than or equal to 1 g/10 min (as measured by ASTM D-1238-04, 190° C., 8.7 kg). In another embodiment, the TPU has a melt index less than or equal to 100 g/10 min, or less than or equal to 50 g/10 min, or less than or equal to 20 g/10 min, (ASTM D-1238-04, 190° C., 8.7 kg). In another embodiment, the TPU has a melt index from 0.1 g/10 min to 100 g/10 min, or from 0.5 g/10 min to 50 g/10 min, or from 1 g/10 min to 20 g/10 min.

Nonlimiting examples of suitable TPUs include the PEL-LETHANE™ thermoplastic polyurethane, TECOFLEX™ thermoplastic polyurethanes, TECOPLAST™ thermoplastic polyurethanes, TECOPHILIC™ thermoplastic polyurethanes, TECOTHANE™ thermoplastic polyurethanes, ESTANE™ thermoplastic polyurethane elastomers, and ISOPLAST™ thermoplastic polyurethanes available from Lubrizol Advanced Materials; CARBOTHANE™ thermoplastic polyurethanes, available from Noveon; ELASTOLLAN™ thermoplastic polyurethanes and other thermoplastic polyurethanes available from BASF; and commercial thermoplastic polyurethanes available from Bayer, Huntsman, and Merquinsa.

In an embodiment, the thermoplastic elastomer is a TPU with a Shore hardness value from about 60 A to less than 50 D. Shore hardness is measured in accordance with ASTM D2240.

In an embodiment the thermoplastic elastomer includes a thermoplastic polyester elastomer (TPEE). A "thermoplastic polyester elastomer," as used herein, is a thermoplastic elastomer comprising a polyester hard segment and a polyoxyalkylene glycol soft segment. Nonlimiting examples of suitable hard segments include polybutylene terephthalate (PBT), and polybutylene naphthalate (PBN). Nonlimiting examples of suitable soft segments include polytetramethylene glycol (PTMG), polycaprolactone (PCL), and polybutylene adipate (PBA). The TPEE has a Shore hardness value in the range of 25 D to less than 50 D. Nonlimiting examples of commercial TPEE include ARNITEL™ from DSM, and HYTREL™ from Du Pont.

In an embodiment, the thermoplastic elastomer includes polyamide elastomer. A "polyamide elastomer," as used herein, is a thermoplastic elastomer comprising a polyamide hard segment and a soft segment that is a polyether and/or a polyester. The polyamide ester has a Shore hardness value in the range of 80 A to less than 50 D. Nonlimiting examples of suitable polyamide elastomer includes PEBAX™ from Arkema.

The composition may contain one, or more than one, thermoplastic elastomer. In an embodiment, the composition includes a first thermoplastic elastomer and a second thermoplastic elastomer, the second thermoplastic elastomer different than the first thermoplastic elastomer.

In an embodiment, the present composition includes the thermoplastic elastomer in a lower amount of about 48 wt %, or about 50 wt %, or about 55 wt %, and an upper amount of the thermoplastic elastomer of about 75 wt %, or about 70 wt %, or about 65 wt % or about 60 wt %. Weight percent is based on the total weight of the composition.

The present composition includes a flame retardant. The flame retardant is composed of a metal hydrate and an oligomeric phosphate ester. In an embodiment, the flame retardant is an intumescent flame retardant. An "intumescent flame retardant" is a flame retardant that yields a foamed char formed on a surface of a polymeric material during fire exposure.

The flame retardant includes a metal hydrate. Bounded by no particular theory, the metal hydroxide is a water-generating (or a water vapor-generating) agent to provide foaming during combustion of the present composition. Nonlimiting examples of suitable metal hydrates include magnesium hydroxide, aluminum hydroxide, alumina monohydrate, hydromagnesite, zinc borate hydrate, and any combination thereof.

The flame retardant may contain one, or more than one, metal hydrate(s). In an embodiment, the flame retardant includes a first metal hydrate and a second metal hydrate, the second metal hydrate different than the first metal hydrate.

In an embodiment, the metal hydrate is aluminum hydroxide and/or magnesium hydroxide.

The metal hydrate is present in the composition at a lower amount of about 30 wt %, or about 35 wt %, or about 37 wt % and at an upper amount of about 60 wt %, or about 50 wt %, or about 45 wt %. Weight percent is based on the total weight of the composition.

The flame retardant also includes an oligomeric phosphate ester (OPE). An "oligomeric phosphate ester," as used herein, is a compound of the structure (II):

wherein R is independently a divalent $C_1$-$C_{20}$ linear, branched or cyclic alkylene or alkylidene radical, or a divalent $C_6$-$C_{30}$ arylene radical having one or more aromatic nuclei, or a substituted derivative of any of same; Z is independently selected from the group of (i) monovalent $C_1$-$C_{20}$ linear, branched or cyclic alkylene or alkylidene radical, (ii) monovalent $C_6$-$C_{30}$ arylene radicals having one or more aromatic nuclei or substituted derivatives of any of same, or (iii) a hydrogen radical; each m is independently zero or 1, preferably 1; and n is from about 1 to about 10 (inclusive), or any subset thereof, or from about 1 to about 7, or from about 1 to about 3. The term, n, can represent the average number of repeating units for an aromatic phosphate ester oligomer where the aromatic phosphate ester oligomer composition contains a statistical distribution of phosphate compounds as typically results from an oligomerization process. As a result, n need not be a whole number for a particular aromatic phosphate ester oligomer composition.

Representative mono- or di-valent arylene radicals in R and Z are based on and include phenylene, biphenylene, 2,2-diphenyl propane, napththenylene, anthracenylene, and substituted derivatives thereof, and the like. Nonlimiting examples of arylene radicals from which R or Z may be derived include the remnants of resorcinol, 1-bis(4-hydroxyphenyl)-1-phenyl ethane ("Bisphenol-AP" or "Bis-AP"), 9,9-bis(4-hydroxyphenyl) fluorine ("BHPF") or Bisphenol A. In an embodiment, R is selected from a divalent $C_2$-$C_{20}$ linear, branched or cyclic alkylene or alkylidene radical, or a divalent $C_6$-$C_{30}$ arylene radical having one or more aromatic nuclei, or a substituted derivative of any of same; Z is a monovalent $C_6$ arylene radical, each m is 1, and n is from about 1 to about 3.

Nonlimiting examples of suitable oligomeric phosphate ester include resorcinol tetraphenyl diphosphate, bis-phenol A tetraphenyl diphosphate, resorcinol diphosphate, resorcinol diphenyl phosphate (RDP), bisphenol A polyphosphate (BAPP), bisphenol A diphenyl phosphate (BPADP), bisphenol A diphosphate (BADP), (2,6-dimethylphenyl) 1,3-phenylene bisphosphate, and any combination thereof.

The flame retardant may contain one, or more than one, oligomeric phosphate esters. In an embodiment, the flame retardant includes more than one OPE, such as a first OPE and a second OPE, the second OPE different than the first OPE.

The OPE is present in the composition at a lower amount of about 5 wt %, or about 10 wt %, or about 15 wt % and at an upper amount of about 35 wt %, or about 30 wt %, or about 25 wt %. Weight percent is based on the total weight of the present composition.

In an embodiment, the flame retardant is devoid of a halogen or is otherwise halogen-free.

In an embodiment, the flame retardant is devoid of nitrogen or is otherwise nitrogen-free.

In an embodiment, the OPE is devoid of a halogen or is otherwise halogen-free.

In an embodiment, the OPE is devoid of nitrogen or is otherwise nitrogen-free.

The flame retardant has a weight ratio of metal hydrate to organic phosphate of greater than 1.45:1, or from greater than 1.45-12.0:1, or 1.5-9.0:1, or 1.7-6:1, or 2.0-4.0:1. Nonlimiting examples of weight ratios for flame retardant components and flame retardant total load are provided in Table 1 below.

TABLE 1

| FR-total load (wt %) | 48 | 50 | 55 | 60 | 65 | 70 | 75 |
|---|---|---|---|---|---|---|---|
| MH (wt %) | 43 to 29 | 45 to 30 | 50 to 33 | 55 to 36 | 60 to 39 | 60 to 42 | 60 to 45 |
| OPE (wt %) | 5 to 19 | 5 to 20 | 5 to 22 | 5 to 24 | 5 to 26 | 10 to 28 | 15 to 30 |
| MH:OPE ratio | 1.5-8.6:1 | 1.5-9.0:1 | 1.5-10:1 | 1.5-11:1 | 1.5-12:1 | 1.5-6.0:1 | 1.5-4.0:1 |

FR = flame retardant
MH = metal hydrate
OPE = oligomeric phosphate ester
wt % based on the total weight of the composition Applicants have surprisingly discovered that the composition with (1) the flame retardant load and (2) the MH:OPE weight ratio of greater than 1.45:1 unexpectedly yields a flame retardant thermoplastic elastomer composition that passes the stringent VW-1 test for wire and cable applications. In addition, the composition advantageously has a V-1 rating or better based on UL-94.

In an embodiment, the composition contains from about 12 wt % to about 50 wt % of the thermoplastic elastomer, and from about 48 wt % to about 75 wt % of the flame retardant. In addition, the flame retardant includes from about 30 wt % to about 60 wt % of the metal hydrate (MH) and from about 5 wt % to about 35 wt % of the oligomeric phosphate ester (OPE). The weight ratio of MH:OPE is greater than 1.45:1.

In an embodiment, the flame retardant is composed solely of the metal hydrate (one or more) and the oligomeric phosphate ester (one or more). In other words, the flame retardant consists of only metal hydrate and oligomeric phosphate ester.

In an embodiment, the composition is formed into a plaque. The plaque has a tensile strength from about 2.5 MPa to about 10 MPa. Tensile strength is measured in accordance with ASTM D638.

In an embodiment, the composition is formed into a plaque. The plaque has a tensile elongation at break from about 200% to about 700%, or from about 300% to 650%, as measured in accordance with ASTM D638. Applicants have surprisingly discovered that provision of a thermoplastic elastomer with a Shore hardness less than 50 D unexpectedly produces a composition with excellent flexibility, namely from about 200% to about 700% tensile elongation at break. In a further embodiment, the composition has a Shore hardness less than 50 D.

The present application provides another composition. In an embodiment, a composition is provided which includes a thermoplastic elastomer, a polar olefin-based polymer, and a flame retardant. The flame retardant includes a metal hydrate and an oligomeric phosphate ester. The thermoplastic elastomer and the flame retardant may by any respective thermoplastic elastomer and flame retardant as disclosed herein.

In an embodiment, the weight ratio of the metal hydrate to oligomeric phosphate ester is greater than 1.45:1.

As used herein, an "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers. A "polar olefin-based polymer," is an olefin-based polymer containing one or more polar groups (sometimes referred to as polar functionalities). A "polar group," as used herein, is any group that imparts a bond dipole moment to an otherwise essentially nonpolar olefin molecule. Exemplary polar groups include carbonyls, carboxylic acid groups, carboxylic acid anhydride groups, carboxylic ester groups, epoxy groups, sulfonyl groups, nitrile groups, amide groups, silane groups and the like, and these groups can be introduced into the olefin-based polymer either through grafting or copolymerization.

Nonlimiting examples of polar olefin-based polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, maleic anhydride- or silane-grafted olefin polymers, poly(tetrafluoroethylene-alt-ethylene) (ETFE), poly(tetrafluoroethylene-co-hexafluoro-propylene) (FEP), poly(ethylene-co-tetrafluoroethylene-co-hexafluoropropylene (EFEP), poly(vinylidene fluoride) (PVDF), poly(vinyl fluoride) (PVF), and the like. Commercial embodiments of polar olefin-based polymers include DuPont ELVAX™ ethylene vinyl acetate (EVA) resins, AMPLIFY™ ethylene ethyl acrylate (EEA) copolymer from The Dow Chemical Company, PRIMACOR™ ethylene/acrylic acid copolymers from The Dow Chemical Company, and SI-LINK™ poly(ethylene-co-vinyltrimethoxysilane) copolymer from The Dow Chemical Company.

In an embodiment, the polar olefin-based polymer is ethylene vinyl acetate copolymer (EVA). The EVA has a vinyl acetate content from about 3 wt % to about 45 wt %, based on the total weight of the EVA. The EVA may form a continuous phase (or matrix) or a co-continuous phase with the thermoplastic elastomer. The flame retardant is dispersed throughout the continuous phase and/or the co-continuous phase.

In an embodiment, the EVA is present in the composition in a lower amount of about 1 wt %, or about 5 wt %, or about 10 wt % and in an upper amount of about 30 wt %, or about 25 wt %, or about 20 wt %. In a further embodiment, the composition contains 10 wt % to 15 wt % of EVA. Weight percent is based on the total weight of the composition.

In an embodiment, the composition contains from about 12 wt % to about 50 wt % of the thermoplastic elastomer, from about 1 wt % to about 30 wt % EVA, and from about 48 wt % to about 75 wt % of the flame retardant. In addition, the flame retardant includes from about 30 wt % to about 60 wt % of the metal hydrate and from about 5 wt % to about 35 wt % of the oligomeric phosphate ester. The ratio of metal hydrate to oligomeric phosphate ester can be any ratio, or any ratio range, as previously disclosed herein. The amount of flame retardant and the MH:OPE weight ratio provide the composition with a V-1 rating or better as determined in accordance with UL-94.

In an embodiment, the composition is formed into a plaque. The plaque has a tensile strength from about 2.5 MPa to about 10 MPa. Tensile strength is measured in accordance with ASTM D638.

In an embodiment, the composition is formed into a plaque. The plaque has a tensile elongation at break from about 200% to about 700% or from about 300% to about 650% as measured in accordance with ASTM D638.

In an embodiment, the composition with the polar olefin-based polymer has a Shore hardness of less than 50 D.

Any of the foregoing compositions may include one or more of the following additives: an anti-drip agent, a hindered amine light stabilizer (having at least one secondary or tertiary amine group) ("HALS"), UV light absorbers (such as o-hydroxyphenyltriazines), antioxidants, curing agents, boosters and retardants, processing aids, fillers, coupling agents, antistatic agents, nucleating agents, slip agents, plasticizers, lubricants, viscosity control agents, tackifiers, anti-blocking agents, surfactants, extender oils, acid scavengers, metal deactivators, and any combination thereof.

In an embodiment, the composition is drip-free. As used herein, a "drip-free composition" is a composition that, when exposed to heat or flame, produces no vertical drop of molten particles which ignite cotton located under the composition.

In an embodiment, the present composition includes an anti-drip agent. The anti-drip agent prevents the composition from drip when exposed to flame. The anti-drip agent may be any anti-drip agent as known in the art. Nonlimiting examples of suitable anti-drip agents include fluororesin, such as poly(tetrafluoroethylene), polyvinylidene fluoride or tetrafluoroethylene/hexafluoropropylene copolymers and ethylene/tetrafluoroethylene copolymers, teflon-grafted styrene-acrylonitrile copolymer (T-SAN), fluorinated polyolefin, lithium, sodium, potassium or cesium salt of 1,1,2,2-tetrafluoroethanesulfonate or 1,1,2,3,3,3-hexafluoropropanedulfonate. Further nonlimiting examples of suitable anti-drip agents includes silicone resins, silicone oil, phosphoric acid, phosphorous acid, hypophosphorous acid, hypophosphoric acid, phosphinic acid, phosphonic acid, metaphosphoric acid, hexanetaphosphoric acid, thiophosphoric acid, fluorophosphoric acid, difluorophosphoric acid, fluorophosphorous acid, difluorophosphorous acid, fluorohypophosphorous acid and fluorohypophosphoric acid. The anti-drip agent may be one or more of any of the aforementioned anti-drip agents. In an embodiment, the anti-drip agent is halogen-free.

In an embodiment, the present composition includes a hindered amine light stabilizer (HALS). Nonlimiting examples of suitable HALS include TINUVIN® 770 (bis-(2,2,6,6-tetramethyl-4-piperidinyl)sebacate), TINUVIN® 144 (bis-(1,2,2,6,6-pentamethyl-4-piperidinyl)-2-n-butyl-2-(3,5-di-tert-butyl-4-hydroxybenzyl)malonate), and SANDU-VOR® PR-31 (propanedioic acid, [(4-methoxyphenyl)-methylene]-bis-(1,2,2,6,6-pentamethyl-4-piperidinyl)ester).

In an embodiment, the present composition includes an antioxidant. Nonlimiting examples of suitable antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)] sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers. Antioxidants can be used in amounts of 0.1 to 5 wt % based on the weight of the composition.

In an embodiment, the present composition includes a processing aid. Nonlimiting examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the composition.

In an embodiment, the composition is void of a halogen or is otherwise halogen-free.

The present composition(s) may comprise two or more embodiments disclosed herein.

The present disclosure provides an article. In an embodiment, an article is provided which includes a component comprising the present composition. In particular, the article includes a component composed of a composition including a thermoplastic elastomer, a flame retardant, and optionally a polar olefin-based polymer. The thermoplastic elastomer has a Shore hardness of less than 50 D. The flame retardant includes a metal hydrate and an oligomeric phosphate ester with a MH:OPE weight ratio of greater than 1.45:1. The weight percent of each individual component in the composition may be any value or range as previously disclosed herein.

In an embodiment, the article includes a metal conductor and a coating on the metal conductor. This forms a coated metal conductor. A "metal conductor," as used herein, is at least one metal wire and/or at least one metal cable. The coated metal conductor may be flexible, semi-rigid, or rigid.

A coating (also referred to as a "jacket" or a "sheath") is on the metal conductor. The coating includes the composition. The composition may be any composition as disclosed herein. As used herein, "on" includes direct contact or indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening structure(s) and/or intervening material(s)

is/are located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In an embodiment, the article is a coated metal conductor. Applicants have surprisingly discovered a wire jacket or coating composed of the present composition exhibits strong flame retardancy and excellent flexibility (as evidenced by the high tensile elongation at break range) for flexible wire applications. Nonlimiting examples of suitable coated metal conductors include flexible wiring such as flexible wiring for consumer electronics, a power cable, a power charger wire for cell phones and/or computers, computer data cords, power cords, appliance wiring material, and consumer electronic accessory cords.

In an embodiment, the coated metal conductor has a VW-1 rating determined in accordance with method 1080 of UL-1581.

The article may comprise two or more embodiments disclosed herein.

Compounding

The present composition can be prepared by compounding the individual components. Nonlimiting examples of suitable compounding equipment include internal batch mixers, such as a Haake Rheometer mixer, Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

When a screw mixer is used, the individual components may be introduced to the screw mixer by way of a main hopper, a side feeder, or a combination thereof.

In an embodiment, the metal hydrate is separated into two portions, a first portion is mixed with thermoplastic elastomer (and optionally with the polar olefin-based polymer) and is introduced into the screw mixer from the main hopper. The second portion is introduced into the screw mixer from side feeder.

In an embodiment, a portion of the metal hydrate is introduced into the screw mixer from the main hopper together with polar olefin-based polymer. Another portion of the metal hydrate is mixed with the thermoplastic elastomer and introduced into the screw mixer by way of the side feeder.

In an embodiment, the metal hydrate is mixed with polar olefin-based polymer to form a master-batch. The formed master-batch is then mixed with thermoplastic elastomer and organic phosphate.

An article such as a coated wire or a coated cable with an insulation layer and/or a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200° C. to about 350° C., or in the range of about 170° C. to about 250° C. The heated zone can be heated by pressurized steam, or inductively heated pressurized nitrogen gas.

The wire and cable constructions (i.e., a coated metal conductor) of this disclosure are made by extruding the present composition onto the bundle of insulated conductors to form a coating (or a jacket) around the insulated conductors. The thickness of the jacket depends on the requirements of the desired end use application. Typical thickness of the jacket is from about 0.010 inches to about 0.200 inches, or from about 0.020 inches to about 0.050 inches. The present composition may be extruded into the jacket from previously made composition. Usually the present composition is in the form of pellets for easy feeding into the extruder. The wire and cable jacket may be extruded directly from the compounding extruder without going through the separate step of pelletizing the present composition. This one-step compounding/extrusion process would eliminate one heat history step for the composition.

Nonlimiting embodiments of the composition and the article are provided below.

The present disclosure provides a composition. In an embodiment a composition is provided comprising from about 12 wt % to about 50 wt % of a thermoplastic elastomer and from about 48 wt % to about 75 wt % of a flame retardant. The thermoplastic elastomer has a Shore hardness less than 50 D. The flame retardant comprises a metal hydrate and an oligomeric phosphate ester. The weight ratio of metal hydrate to oligomeric phosphate ester is greater than 1.45:1.

In an embodiment, the thermoplastic elastomer of the composition is selected from the group consisting of thermoplastic polyurethane, thermoplastic polyester elastomer, polyamide elastomer, and combinations thereof.

In an embodiment, the oligomeric phosphate ester of the flame retardant is selected from the group consisting of resorcinol bis(diphenyl phosphate), bisphenol A bis(diphenyl phosphate), bisphenol A polyphosphate, and combinations thereof.

In an embodiment, the composition comprises from about 30 wt % to about 60 wt % of the metal hydrate and from about 5 wt % to about 35 wt % of the oligomeric phosphate ester.

In an embodiment, the ratio of metal hydrate to oligomeric phosphate ester is 1.5-12.0:1.

In an embodiment, the composition comprises a second thermoplastic elastomer.

In an embodiment, the composition comprises a component selected from the group consisting of an antioxidant, a processing stabilizer, and combinations thereof.

In an embodiment, the composition has a Shore hardness less than 50 D.

In an embodiment, the composition has a V-1 rating or better as determined in accordance with the UL-94 flame test.

In an embodiment, the composition is a plaque having a tensile strength from about 2.5 MPa to about 10 MPa as measured in accordance with ASTM D638.

In an embodiment, the composition has a tensile elongation at break from about 200% to about 700% as measured in accordance with ASTM D638.

The present disclosure provides another composition. In an embodiment, a composition is provided and comprises a thermoplastic elastomer, a polar olefin-based polymer, and a flame retardant. The flame retardant comprises a metal hydrate and an oligomeric phosphate ester.

In an embodiment, the weight ratio of metal hydrate to oligomeric phosphate ester is greater than 1.45:1.

In an embodiment, the composition comprises from about 12 wt % to about 50 wt % of the thermoplastic elastomer, from about 1 wt % to about 30 wt % ethylene vinyl acetate copolymer, from about 48 wt % to about 75 wt % of the flame retardant, from about 30 wt % to about 45 wt % metal hydrate, and from about 5 wt % to about 35 wt % oligomeric phosphate ester.

In an embodiment, the thermoplastic elastomer has a Shore hardness less than 50 D.

In an embodiment, the composition comprises a component selected from the group consisting of an antioxidant, a processing stabilizer, and combinations thereof.

In an embodiment, the composition has a V-1 rating or better as determined in accordance with UL-94 flame test.

The present disclosure provides an article. In an embodiment, an article is provided which comprises at least one component composed of a composition comprising a thermoplastic elastomer, and a flame retardant. The thermoplastic elastomer has a Shore hardness less than 50 D. The flame retardant comprises a metal hydrate and an oligomeric phosphate ester. The weight ratio of metal hydrate to organic phosphate is greater than about 1.45:1.

In an embodiment, the composition in the article comprises a polar olefin-based polymer.

In an embodiment, the oligomeric phosphate ester present in the article is selected from the group consisting of resorcinol bis(diphenyl phosphate), bisphenol A bis(diphenyl phosphate), bisphenol A polyphosphate, and combinations thereof.

In an embodiment, the article comprises a metal conductor and a coating on the metal conductor. The coating comprises the composition.

In an embodiment, the coating has a Shore hardness less than 50 D.

In an embodiment, the coating has a tensile strength at break from about 200% to about 700% as measured in accordance with ASTM D638.

In an embodiment, the coated metal conductor is selected from the group consisting of a flexible wire, a power cable, an appliance wiring material, and combinations thereof.

In an embodiment, the coated metal conductor has a VW-1 rating as determined in accordance with method 1080 of UL-1581.

Test Methods

Tensile elongation at break is measured in accordance with ASTM D638. Tensile elongation is measured by setting crosshead speed to 50 mm/minute with the % elongation measured using an extensometer with a 25 mm initial gauge length to measure strain to break and tensile properties calculated via standard calculation using load and specimen cross-sectional area with ASTM D638 as the method.

Tensile strength at break is measured in accordance with ASTM D638.

Secant 2% modulus is measured in accordance with ASTM D638. For secant modulus, a 58 mm (2.25") initial jaw separation is used, and a 50 mm/minute (2.0 ipm) testing speed to provide about a 100%/minute specimen strain rate. The 1% secant modulus data is determined using a crosshead displacement method at 1% strain (0.01 minute=0.6 second deflection) with ASTM D638 as the method.

UL-94 is the Underwriters' Laboratory (UL) Bulletin 94 Tests for Flammability of Plastic Materials for Parts in Devices and Appliances. The material tested is UL 94 V-0 classified if:

None of the five test specimens burn for over 10 seconds at any time when the burner flame is removed.

The total burning time of the 10 ignition test does not exceed 50 seconds.

No test specimen burns either with a flame or afterglow to the clamp.

No burning drops should fall which would cause the cotton underneath to ignite from any test specimen.

The afterglow burning of no test specimen exceeds 30 seconds.

The material tested is UL 94 V-1 classified if:

None of the five test specimens burn for over 30 seconds at any time when the burner flame is removed.

The total burning time of the 10 ignition test does not exceed 250 seconds.

No test specimen burns either with a flame or afterglow to the clamp.

No burning drops should fall which would cause the cotton underneath to ignite from any test specimen.

The afterglow burning of no test specimen exceeds 60 seconds.

The material tested is UL 94 V-2 classified if:

None of the five test specimens burn for over 30 seconds at any time when the burner flame is removed.

The total burning time of the 10 ignition test does not exceed 250 seconds.

No test specimen burns either with a flame or afterglow to the clamp.

Only such burning pieces may fall from the test specimen, which burn only momentarily, and of which some ignite the cotton underneath.

The afterglow burning of no test specimen exceeds 60 seconds.

VW-1 is an Underwriters' Laboratory (UL) flame rating for wire and sleeving. It denotes "Vertical Wire, Class 1", which is the highest flame rating a wire or sleeve can be given under the UL 1441 specification. The test is performed by placing the wire or sleeve in a vertical position. A flame is set underneath it for a period of time, and then removed. The characteristics of the sleeve are then noted. The VW-1 flame test is determined in accordance with method 1080 of UL-1581.

By way of example, and not by limitation, examples of the present disclosure are provided.

EXAMPLES

Ingredients

TABLE 2

| Component | Material |
|---|---|
| A1 | Pellethane ™ 2103-90AE, polytetramethylene glycol ether TPU; from Lubrizol Advanced Materials, with Shore D hardness 48.2 |
| A2 | Pellethane ™ 2355-75A, polyester polyadipate TPU, from Lubrizol Advanced Materials, with Shore D hardness 44.7 |
| A3 | TPU 1195 from Yantai Wanhua Polyurethanes Co., Ltd., with Shore D hardness 52.3 |
| B1 | Elvax ™ 265, EVA with 28% VA, from Du Pont Company |
| B2 | Elvax ™ 40L-03, EVA with 40% VA, from Du Pont Company |

TABLE 2-continued

| Component | Material |
|---|---|
| C | Aluminum hydroxide (ATH), grade H42M, from Showa Chemical |
| D1 | Resorcinol Bis(Diphenyl Phosphate) (RDP), grade Fyrolflex ® RDP from Supresta |
| D2 | Bisphenol-A bis(diphenyl phosphate) (BPADP), grade FP700 from Adeka |
| E1 | Tetrafluro ethylene-co-Styrene-co-acrylonitrile, grade AD001 from Daikin (AD001) |
| G1 | Primary Anti-oxidant, Irganox ™ 1010 from Ciba Specialty Chemicals |
| G2 | Secondary Anti-oxidant, Irgafos ™ 168 from Ciba Specialty Chemicals |

Processing.

The compositions shown in Table 2 are used to prepare the composition in Table 3 using a laboratory Haake mixer. Model number is HAAKE Rheomix 600OS, with drive system as Polylab Drive RheoDrive7. It is produced by Thermo Scientific. Mixing temperature is set at 185° C.

With roller rotor, at 10 RPM rotor speed, component A and/or component B are/is added into mixing bowl and mixed for 2 min to reach homogeneous melt state. Component C and component D are then added into the bowl in 2 min, followed with 5 min mixing at 55 rpm. After the mixing, the composite is taken out from the mixing bowl, cooled down to room temperature.

A compression molded plaque is prepared by compression moulding at 185° C. Preheating time is about 3 min., following with 2 min pressing under 15 Mpa. The plaque is cooled down to room temperature, and cut into specimen fit for ASTM D-638 Type W tensile testing.

Figure 1:
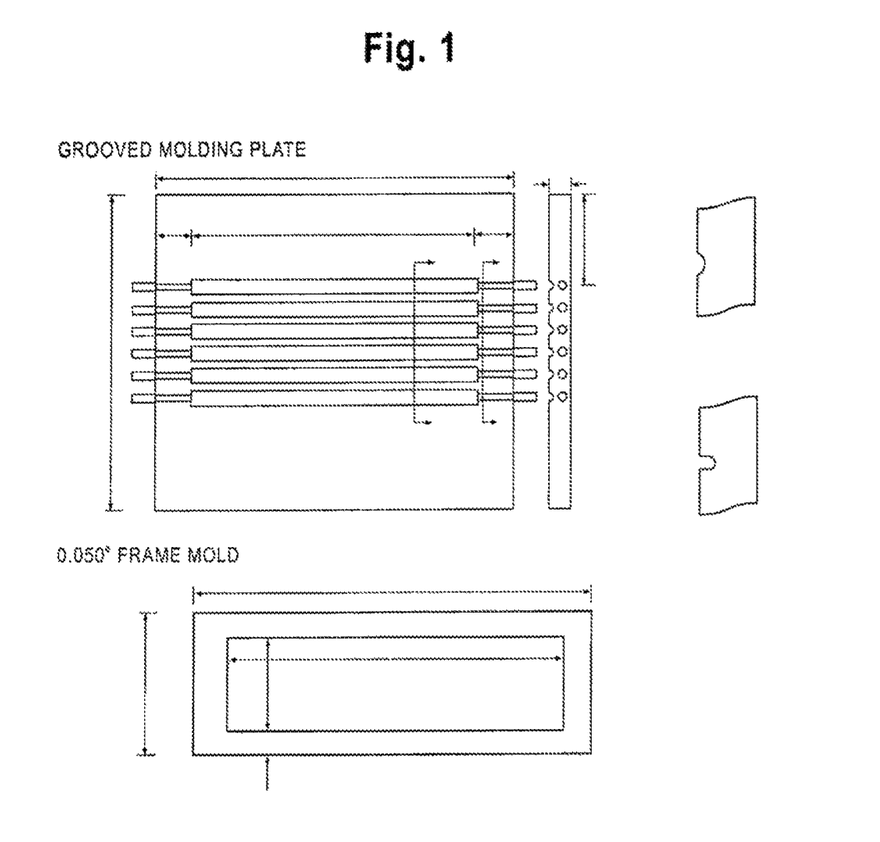
FIG. 1 is a schematic representation of a wire molder in accordance with an embodiment of the present disclosure.

Wire for simulated VW-1 testing is prepared by compression molding. FIG. 1 shows the schematic structure of the molder. Single copper conductor with a diameter of 0.5 mm is put into the center of each notch. Hot presser temperature is set at 185° C. Preheating time is about 3 min following with 2 min pressing under 13 MPa. The plaque is cooled down to room temperature, and cut into strip wire (203 mm×2.5 mm×2 mm), annealed at 23±2° C. and 50±2 percent relative humidity for at least 24 hrs before flame retardant testing.

Testing.

Tensile testing is conducted on Instron™ tensile tester (Model 5565 from Instron) according to ASTM D638.

Shore hardness testing is carried out in accordance with ASTM D2240.

Figure 2:
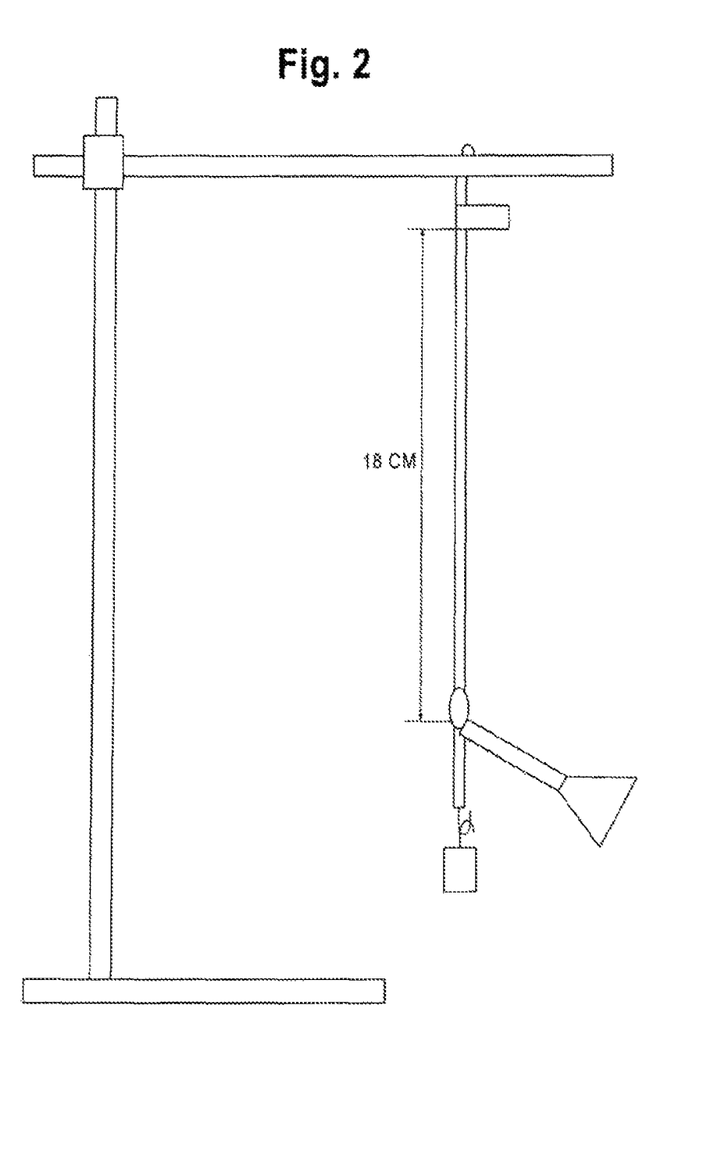
FIG. 2 is a schematic representation of a flame testing apparatus in accordance with an embodiment of the present disclosure.

Simulated VW-1 FR testing is conducted in a standard UL94 chamber, with methane gas flow rate of 105 ml/min, back pressure less than 10 mm of water. Burner's yellow-tipped blue flame is 20±1 mm high. The burner angle is 45° to avoid dripping into burner tube during combustion. Testing sketch is shown in FIG. 2. The wire strip hangs on the clamp, with longitudinal axis vertical by applying 50 g loading on the bottom end. One paper flag (2 cm×0.5 cm) is applied on the top of the wire. The distance of flame bottom (highest point of burner oracle) to the bottom of flag is 18 cm. Flame is applied continuously for 45 sec. After flame time (AFT), uncharred wire length (UCL) and uncharred flag area percentage (Flag uncharred) is recorded during and after combustion. 4 or 5 specimens are tested for each formulation.

As shown in Table 3 (component proportions in Table 3 are in wt % of total composition), with ATH+RDP above 48%, and ATH/RDP greater than 1.45:1 (wt), all formulations from Example 1 to Example 9 pass the simulated VW-1 test easily, whether it is TPU/EVA blends in examples 1, 1-1, 2, or 7, or TPU as polymer material in examples 3, 4, 5, 6, 8, 9. The addition of antioxidants and processing stabilizer does not deteriorate the FR performance. In all nine examples, after flame time (AFT) is short, uncharred length (UCL) on the strip wire is so long that the flame has little chance to touch the flag on the top of specimen. Large swell of the specimen under flame is observed, showing very effective intumescency for examples 1-9.

As shown in comparative example 2, without oligomeric phosphate ester the entire specimen burns out, together with flag on the top. The residual wire after combustion is just metal oxide, with visual size the same as that before ignition, showing no intumescency. When the metal hydrate/oligomeric phosphate ester ratio is not above 1.45:1, as in comparative example 1, flame retardancy is insufficient to pass simulated VW-1 testing.

TABLE 3

| | Comp. Ex. 1 | Comp. Ex. 2 | Comp. Ex. 3 | Comp Ex. 4 | Ex 1 | Ex 1-1 | Ex 2 | Ex 3 | Ex 4 | Ex 5 | Ex 6 | Ex7 | Ex 8 | Ex 9 |
|---|---|---|---|---|---|---|---|---|---|---|---|---|---|---|
| Formulation | | | | | | | | | | | | | | |
| Component A1 | 26.0 | 26.0 | | | 26.0 | 26.0 | 26.0 | 40.0 | 40.0 | 45.0 | 50.0 | | | |
| Component A2 | | | | | | | | | | | | 26.0 | 40.0 | 40.0 |
| Component A3 | | | 40.0 | 50.0 | | | | | | | | | | |
| Component B1 | 5.9 | 5.9 | | | 5.9 | 5.9 | 5.9 | | | | | 5.9 | | |
| Component B2 | 8.1 | 8.1 | | | 8.1 | 8.1 | 8.1 | | | | | 8.1 | | |
| Component C | 35.0 | 60.0 | 40.0 | 40.0 | 40.0 | 40.0 | 40.0 | 40.0 | 40.0 | 40.0 | 40.0 | 40.0 | 40.0 | 40.0 |
| Component D1 | 25.0 | | 20.0 | 10.0 | 20.0 | 20.0 | 20.0 | 20.0 | | 15.0 | 10.0 | 20.0 | 20.0 | |
| Component D2 | | | | | | | | | 20.0 | | | | | 20.0 |
| AD001 | 0.5 | | 0.3 | 0.3 | 0.3 | | 0.4 | 0.3 | 0.4 | 0.5 | 0.5 | 0.3 | 0.3 | 0.3 |
| Irganox 1010 | | | | | | 0.3 | | | | | | | | |
| Irgafox168 | | | | | | 0.1 | | | | | | | | |
| TOTAL | 100.5 | | 100.3 | 100.3 | 100.3 | 100.0 | 100.8 | 100.3 | 100.4 | 100.5 | 100.5 | 100.3 | 100.3 | 100.3 |
| Mechanical Performance | | | | | | | | | | | | | | |
| Tensile strength (MPa) | 3.1 | 7.25 | 6.09 | 6.9 | 3.7 | 3.1 | 3.6 | 7.3 | 7.1 | 8.6 | 9.5 | 2.7 | 8.5 | 8.6 |
| Tensile elongation (%) | 406 | 13.4 | 28.07 | 11.1 | 368 | 340 | 336 | 483 | 403 | 508 | 436 | 235 | 609 | 587 |
| Shore A | | | 90.3 | 93.5 | | | 87.5 | | | | | | | |

TABLE 3-continued

|  | Comp. Ex. 1 | Comp. Ex. 2 | Comp. Ex. 3 | Comp Ex. 4 | Ex 1 | Ex 1-1 | Ex 2 | Ex 3 | Ex 4 | Ex 5 | Ex 6 | Ex7 | Ex 8 | Ex 9 |
|---|---|---|---|---|---|---|---|---|---|---|---|---|---|---|
| Shore D |  |  | 40.3 | 51.8 |  |  |  | 34.7 |  |  |  |  |  |  |
| Wire Strip FR Testing |  |  |  |  |  |  |  |  |  |  |  |  |  |  |
| AFT-1 (sec) | 0 | 128 | 0 | 2 | 0 | 12 | 1 | 0 | 0 | 0 | 0 | 0 | 0 | 0 |
| AFT-2 (sec) | 0 | 100 | 0 | 10 | 3 | 0 | 0 | 0 | 0 | 0 | 0 | 80 | 0 | 0 |
| AFT-3 (sec) | 0 | 80 | 0 | 5 | 0 | 9 | 0 | 0 | 0 | 0 | 0 | 2 | 0 | 0 |
| AFT-4 (sec) | 0 | 92 | 0 | 0 | 0 | 9 | 0 | 0 | 0 | 0 | 0 | 0 | 0 | 0 |
| AFT-5 (sec) | 40 |  |  |  | 0 | 5 | 0 | 0 | 0 | 0 | 0 | 25 | 0 | 0 |
| UCL_1(mm) | 110 | 0 | 140 | 90 | 110 | 50 | 60 | 140 | 140 | 113 | 110 | 150 | 130 | 140 |
| UCL_2(mm) | 50 | 0 | 145 | 100 | 40 | 140 | 60 | 130 | 120 | 110 | 135 | 0 | 135 | 142 |
| UCL_3(mm) | 30 | 0 | 150 | 110 | 50 | 60 | 55 | 120 | 125 | 110 | 140 | 140 | 140 | 150 |
| UCL_4(mm) | 120 | 0 | 130 | 130 | 70 | 70 | 50 | 125 | 130 | 120 | 138 | 140 | 145 | 140 |
| UCL_5(mm) | 10 |  |  |  | 65 | 85 | 50 | 110 | 120 | 115 | 142 | 90 | 120 | 135 |
| Flag uncharred_1(%) | 100 | 0 | 100 | 100 | 100 | 100 | 100 | 100 | 100 | 100 | 100 | 100 | 100 | 100 |
| Flag uncharred_2(%) | 0 | 0 | 100 | 100 | 100 | 100 | 100 | 100 | 100 | 100 | 100 | 0 | 100 | 100 |
| Flag uncharred_3(%) | 0 | 0 | 100 | 100 | 100 | 100 | 100 | 100 | 100 | 100 | 100 | 100 | 100 | 100 |
| Flag uncharred_4(%) | 100 | 0 | 100 | 100 | 100 | 100 | 100 | 100 | 100 | 100 | 100 | 100 | 100 | 100 |
| Flag uncharred_5(%) | 30 |  |  |  | 100 | 100 | 100 | 100 | 100 | 100 | 100 | 100 | 100 | 100 |
| AFT_avg(sec) | 8 | 100 | 0 | 4.25 | 0.6 | 7 | 0.2 | 0 | 0 | 0 | 0 | 21.4 | 0 | 0 |
| UCL_avg(mm) | 64 | 0 | 141.25 | 107.5 | 67 | 81 | 55 | 125 | 127 | 113.6 | 133 | 104 | 134 | 141.4 |
| Flag uncharred_avg(%) | 46 | 0 | 100 | 100 | 100 | 100 | 100 | 100 | 100 | 100 | 100 | 80 | 100 | 100 |

AFT = after flame time
UCL = uncharred wire length

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   from about 12 wt % to about 50 wt % of a thermoplastic elastomer with a Shore hardness less than 50D as measured in accordance with ASTM D2240;
   from about 1 wt % to about 30 wt % of a polar olefin-based polymer;
   from about 48 wt % to about 75 wt % of a flame retardant comprising a metal hydrate and an oligomeric phosphate ester, wherein the weight ratio of metal hydrate to oligomeric phosphate ester is greater than 2.0-4.0:1;
   wherein the metal hydrate is present in an amount of 37 wt % to 45 wt %, based on the total weight of the composition, and the oligomeric phosphate ester is present in an amount of 15 wt % to 25 wt % based on the total weight of the composition, and the oligomeric phosphate ester has the structure (II)

(II)

wherein R is independently a divalent $C_1$-$C_{20}$ linear, branched or cyclic alkylene or alkylidene radical, or a divalent $C_6$-$C_{30}$ arylene radical having one or more aromatic nuclei, or a substituted derivative of any of same;
   Z is independently selected from the group consisting of (i) monovalent $C_1$-$C_{20}$ linear, branched or cyclic alkylene or alkylidene radical, (ii) monovalent $C_6$-$C_{30}$ arylene radicals having one or more aromatic nuclei or substituted derivatives of any of same, or (iii) a hydrogen radical;
   each m is independently 0 or 1,
   n is from 1 to 10; and
   the composition has (A) a Shore hardness of less than 50D as measured in accordance with ASTM D 2240, (B) an elongation at break from 300% to 650% as measured in accordance with ASTM D 638, and (C) a VW-1 rating as determined in accordance with method 1080 of UL-1581.

2. The composition of claim 1 wherein the thermoplastic elastomer is selected from the group consisting of thermoplastic polyurethane, thermoplastic polyester elastomer, polyamide elastomer, and combinations thereof.

3. The composition of claim 1 wherein the oligomeric phosphate ester is selected from the group consisting of resorcinol bis(diphenyl phosphate), bisphenol A bis(diphenyl phosphate), bisphenol A polyphosphate and combinations thereof.

4. The composition of claim 1 wherein the polar olefin-based polymer is ethylene vinyl acetate copolymer.

5. An article comprising:
   at least one component composed of the composition of claim 1.

6. The article of claim 5 comprising a metal conductor and a coating on the metal conductor, the coating comprising the composition.

7. The article of claim 6 wherein the coated metal conductor has a VW-1 rating as determined in accordance with method 1080 of UL-1581.

8. The article of claim 6 wherein the thermoplastic elastomer comprises a thermoplastic polyurethane.

9. The article of claim 6 wherein the coating has a tensile elongation at break from 200% to 700% as measured in accordance with ASTM D 638.

* * * * *